(12) United States Patent
Horn

(10) Patent No.: US 9,457,810 B2
(45) Date of Patent: Oct. 4, 2016

(54) METHOD AND APPARATUS FOR REDUCING MOTOR VEHICLE TRAFFIC FLOW INSTABILITIES AND INCREASING VEHICLE THROUGHPUT

(71) Applicant: Berthold K. P. Horn, Intervale, NH (US)

(72) Inventor: Berthold K. P. Horn, Intervale, NH (US)

( * ) Notice: Subject to any disclaimer, the term of this patent is extended or adjusted under 35 U.S.C. 154(b) by 257 days.

(21) Appl. No.: 14/259,832

(22) Filed: Apr. 23, 2014

(65) Prior Publication Data

US 2014/0236449 A1    Aug. 21, 2014

Related U.S. Application Data

(63) Continuation-in-part of application No. 12/903,379, filed on Oct. 13, 2010, now Pat. No. 8,744,661.

(60) Provisional application No. 61/253,611, filed on Oct. 21, 2009.

(51) Int. Cl.
*B60W 30/18* (2012.01)
*B60W 30/16* (2012.01)
*G08G 5/00* (2006.01)
*B60W 50/00* (2006.01)

(52) U.S. Cl.
CPC ............ *B60W 30/16* (2013.01); *G08G 5/0043* (2013.01); *B60W 2050/008* (2013.01); *B60W 2520/10* (2013.01); *B60W 2550/308* (2013.01); *B60W 2550/408* (2013.01); *B60W 2720/106* (2013.01)

(58) Field of Classification Search
CPC ................ G01S 13/931; G01S 2013/9321; G01S 15/42; G01S 13/867; G01S 15/04
See application file for complete search history.

(56) References Cited

U.S. PATENT DOCUMENTS

| 2009/0295601 | A1* | 12/2009 | Villaume | G08G 1/161 340/961 |
|---|---|---|---|---|
| 2010/0019964 | A1* | 1/2010 | Huang et al. | 342/357.06 |
| 2010/0106356 | A1* | 4/2010 | Trepagnier et al. | 701/25 |
| 2010/0256852 | A1* | 10/2010 | Mudalige | G08G 1/22 701/24 |
| 2010/0280751 | A1* | 11/2010 | Breed | 701/207 |
| 2013/0211624 | A1* | 8/2013 | Lind | G05D 1/0278 701/2 |
| 2014/0316865 | A1* | 10/2014 | Okamoto | G08G 1/22 705/14.1 |

* cited by examiner

*Primary Examiner* — Adam Tissot
*Assistant Examiner* — Paul Castro
(74) *Attorney, Agent, or Firm* — Graham Curtin, P.A.

(57) ABSTRACT

A method and apparatus are disclosed for reducing traffic flow instabilities and increasing vehicle throughput by monitoring the distances and velocities of motor vehicles leading and following a center vehicle and controlling the velocities of the vehicles to maintain a steady relative distance between the center vehicle and the leading and following vehicles. Using distance and speed information derived from both leading and following vehicles reduces the loop gain of feedback needed below one (1) and diminishes traffic instabilities caused by "car following."

23 Claims, 5 Drawing Sheets

METHOD AND APPARATUS FOR REDUCING MOTOR VEHICLE TRAFFIC FLOW INSTABILITIES AND INCREASING VEHICLE THROUGHPUT

CROSS-REFERENCE TO RELATED APPLICATION

This application is a continuation-in-part and claims the benefit of U.S. patent application Ser. No. 12/903,379 filed, on Oct. 13, 2010, which claims the benefit of U.S. Provisional Patent Application Ser. No. 61/253,611, filed on Oct. 21, 2009, the contents of both of which are incorporated by reference herein in their entirety.

BACKGROUND

Traffic flow instabilities include slowdowns, back-ups, and alternating waves of stop-and-go driving, which often appear to occur for no obvious reason such as an accident or road construction work. These periodic and often rapid variations in speed and traffic density reduce overall traffic throughput on highways and increase the danger of collisions, cause higher fuel consumption and wear and tear on vehicles, faster abrasion of roadways, and waste the time and fray the nerves of motorists.

Traffic flow instabilities are best understood in light of the relationship between vehicle density and speed. Vehicle density is the number of vehicles in a unit length of a roadway and depends on the average length of such vehicles and the distance between vehicles. Ideally, drivers will attempt to keep a safe distance from vehicles that they are following so that if a lead vehicle were to suddenly apply its brakes, the trailing vehicle could apply its brakes in time to avoid a collision. The safe distance depends on speed and reaction time, specifically $$s_{min} = T \times v$$

where $s_{min}$ is the minimum safe distance, T is reaction time, and v is speed. In practice one factors in a margin of safety by using a value for T that is considerably larger than the typical reaction time. A well known rule of thumb for maintaining a safe minimum distance, for example, calls for a driver to allow one car length between his vehicle and a leading vehicle for each 10 miles per hour of speed. Hence, a motorist travelling at 60 miles per hour should allow a gap of six car lengths between his vehicle and the vehicle he is following. But, in any case, what is important here is that the minimum safe distance is proportional to velocity or speed.

In an ideal world, where drivers maintain a safe minimum distance between their vehicles and the vehicles they are following during rush hours or other peak driving periods, traffic density should decrease at higher speeds as vehicle spacing increases to maintain a safe minimum distance. Conversely, traffic density will increase at lower speeds as the safe minimum distance decreases at lower speeds. Thus, if all drivers maintain a safe minimum distance from vehicles ahead, traffic density (vehicles per unit distance) is inversely proportional to the sum of vehicle length and safe minimum distance, which may be expressed as:

$$= 1/(d + T \times v)$$

where equals traffic density (vehicles per unit distance) and d is the length of a vehicle. Vehicle throughput (vehicles passing a fixed point per unit time) equals density times speed, so $$r = v/(d + T \times v)$$

where r is the throughput (vehicles per second). Thus, at low speeds, throughput is approximately proportional to speed or $$r \Box v/d \text{ (for } v < d/T\text{).}$$

However, even though throughput increases with speed, it does so more and more slowly as speed increases, and throughput approaches an asymptotic value of $$r_{max} = 1/T$$

when v becomes large. If one conservatively assumed total reaction time to be one second, for example, throughput would be ultimately limited to one vehicle per second (or 3600 vehicles per hour per lane).

Unfortunately, in the real world, traffic throughput is not steady during peak driving periods, in part because many drivers do not consistently maintain safe minimum distances. For example, some drivers tailgate or switch lanes precipitously and then reduce their speed to avoid a collision or to establish a safe minimum distance; other drivers attempt to maintain a minimum distance that is less than safe; finally, other drivers maintain a minimum distance that is longer or greater than optimum and cause trailing vehicles to reduce the gap between vehicles. In all of these events, when vehicle density is above a certain level, the application of the brakes of one vehicle to avoid a collision or to establish a safer minimum distance will cause a cascade effect as each following driver applies his or her brakes to compensate for the reduction in the speed of the leading vehicle. Thus, a wave travels backward through the traffic, with amplitude increasing with distance from the original disturbance.

These waves or instabilities increase traffic density because lower speed causes higher densities, and higher densities cause even lower speeds. Indeed, because of this positive feedback, waves in density and speed grow in amplitude until the speed at the low point of the cycle drops to zero and traffic is brought to a standstill. The overall throughput in the presence of these wavelike disturbances of traffic flow is much lower than would be possible with steady flow in part because the average speed is much lower.

Another way of understanding the source of traffic flow instabilities is to consider each driver and vehicle combination as a control system (or a controlled vehicle) that adjusts speed in response to the relative position of a vehicle ahead or leading vehicle, as well as the relative speed of the leading vehicle. Each driver and vehicle can be thought of as a system with an input (the relative position and speed of the leading vehicle) and an output (acceleration or deceleration, and hence, indirectly, speed and position of the controlled vehicle itself). Such a control system can be said to have a "gain" which is the ratio of amplitude of the output to that of the input. If, for example, the control system is able to accurately follow the input, then it has gain of one. It is well known in the art of control systems that, if there exists any motion waveform that is amplified with a gain of more than one by the control system, even if only by a small amount, then cascading many such control systems leads to increasing amplitudes of deviation from the average the further back one goes from the initial disturbance.

So, if there is a frequency of oscillation for which the amplitude of the oscillations at the output of a control system is larger than it is at its input, there will be a problem when many such systems are cascaded. That is, if the systems have gain greater than one for waves of some frequency, then, when multiplied together, these gains produce larger and larger overall gain, as more and more systems are cascaded. For stability, the gains need to be strictly less than one for all frequencies. In other words, the amplitude of the response to a disturbance needs to be less than the amplitude of the disturbance itself.

Yet, vehicles also cannot successfully avoid collisions when there are large amplitude oscillations, unless the gain is higher than one at some frequencies. For example, when a leading vehicle periodically speeds up and slows down it will alternately be ahead of, and then behind, where it would have been if it had moved with a steady velocity equal to its average velocity. The maximum departure from the average position is called the amplitude of the oscillation.

If the gain of the control system of a vehicle following a controlled vehicle is one, then the following vehicle will reproduce exactly the same increases and decreases in velocity (ignoring delay in the control system for the moment) and hence the same departures from the average position. In this case, the separation between the two vehicles is constant and no collision can occur.

However, if the gain of the control system of the following vehicle is less than one, the following vehicle, while still reproducing the motion of the leading vehicle, will do so with reduced amplitude. The two vehicles will collide if the difference in amplitude between their motions exceeds their initial separation. This is most easily seen when the gain is zero; that is, when the following vehicle moves at fixed speed. In that case, as the amplitude of the oscillation of the leading vehicle is increased, a point is reached where the leading vehicle lags so far behind its average position that it drops back to where the following vehicle currently is. When the gain is non-zero, the following vehicle's oscillation will tend to reduce the chance of collision for a fixed amplitude of oscillation, but there will still be some amplitude for which collision is unavoidable.

Overall then, it appears that the control system gain cannot be greater than one, and yet cannot be less than one for safe operation under all conditions. Thus, the problem of traffic flow instability is simply unavoidable when the driver and vehicle are modeled as a simple "car following" control system.

Further, it is also well known in the art of control systems that any delay in a feedback loop can lead to instabilities. Thus the finite reaction time of a driver (and the dynamics of the vehicle and its control system) plays a role in producing instabilities. Shorter reaction times allow higher throughput, because they allow the separation between vehicles to be smaller, but for any given reaction time there will be a critical density above which perturbations are amplified and will propagate. Further, the components of a driver/vehicle control system model are non-linear because speed cannot become negative or exceed some upper limit, and the distance between vehicles cannot become negative either. These non-linearities, along with positive feedback, create the classic conditions for instabilities or even chaotic behavior.

The above is but one way of understanding the origins of traffic flow instabilities. Many different models have been made of traffic flow using mathematical tools such as differential equations, difference equations, cellular automata, fluid flow models, particle tracking, and so-called "car following" models. All show travelling waves of instabilities and amplification of these waves above some critical density. None, however, suggest a solution to the problem.

Because the incidence of large density and speed fluctuations increase with traffic flow density, one approach to the problem is to reduce traffic density by building more roads or more lanes per road. More road construction would certainly help reduce density, but it is not a viable option in many cases in view of land use restrictions or inadequate financing.

Limiting or "metering" roadway access at entry points at or below some target value also certainly helps to reduce traffic density, but it forces roadways to operate well below their maximum carrying capacity.

Another approach would be to reduce driver reaction time to allow vehicles to follow each other more closely at higher speeds without danger of collision by eliminating the standard arrangement of accelerator and brake pedal, which unnecessarily lengthens reaction time because the foot has to be lifted from one and applied to the other. It is unlikely, however, that the standard brake and gas pedal design will ever be replaced.

An automated control system, somewhat analogous to cruise control, using automatic feedback based on sensor readings can reduce "reaction time." But, as pointed out above, there is still a critical density above which instabilities occur. In addition, vehicles with such automated control may cause further instabilities when mixed with vehicles controlled by drivers, because the automated vehicles—with faster reaction times—will appear to be "tail gating" at uncomfortably close range.

Fully automated control systems with high speed communication between vehicles can allow a lead vehicle to directly control several following vehicles that travel together in "platoons" much as the engine of a train controls the motion of attached carriages. However, such an approach is best suited for a separate road system limited to platoons of fully automated vehicles. It is unlikely to be safe in a mixed environment with some vehicles controlled by human drivers. Thus, this approach would either require duplicating existing infrastructure or forcing all vehicles to be converted to completely automatic operation. There are also complex issues concerning the formation of platoons, and how they would enter and exit a highway, or change lanes.

Suggestions for automatic "distance keeping" by a following vehicle with reference to a leading vehicle date at least to the work of Dr. Ichiro Masaki (U.S. Pat. No. 4,987,357). His automobile cruise-control system uses machine vision technology to automatically adjust a controlled vehicle's speed to keep a safe distance from a leading vehicle.

All such suggestions for "adaptive cruise control" rely on information about a leading vehicle, typically the distance to that vehicle and the difference in speed between the leading and the controlled vehicle. A traditional "car following" control system is illustrated in FIG. 1 where the controlled vehicle 'C' takes as input the distance to the leading vehicle 'L' ($d_1$), and the relative speed of the leading vehicle ($v_1-v_c$). A car following system may also have additional inputs, such as the speed of the controlled vehicle $v_c$ itself, as well as parameters that control the operation of the controlled vehicle, such as the desired speed $v_{des}$ and a maximum allowed speed $v_{max}$ as depicted in FIG. 2a. As shown in FIG. 2a, a car following control system outputs a positive acceleration command a, or a negative acceleration command a, to the drive control system in order to speed up or slow down respectively. The control system could alternatively, for example, output a speed set point for the drive control system, or activate mechanical brakes and/or a regenerative braking system.

Importantly, the information flow in a "car following" system is strictly one-way: from leading to controlled vehicle, or in other words from front to back. The controlled vehicle's speed is adjusted based on information of the relative position and speed of the vehicle in front of it. Only the leading vehicle influences what is behind it. There is no information propagating forward from the following vehicle.

SUMMARY OF THE INVENTION

In accordance with one aspect of the present invention, a vehicle control system and method is provided in a center vehicle that relies on information concerning a vehicle in front of the center vehicle and on information concerning a vehicle behind the center vehicle to control the forward motion of the center vehicle. In accordance with another aspect of the present invention, every vehicle, or most vehicles, on the road are provided with the vehicle control system in accordance with the present invention.

In accordance with one aspect of the present invention, a vehicle having a current speed sensor, a driver input and a mechanism to control forward motion of the vehicle, includes a vehicle controller system secured in the vehicle, the vehicle controller system receiving inputs from the current speed sensor and the driver input and providing an output to the mechanism to control forward motion of the vehicle and one or more leading distance sensors, one or more leading speed sensors, one or more following distance sensors, and one or more following speed sensors. Each of the sensors has an output that is provided to the vehicle controller system. The vehicle controller system provides the output to the mechanism to control forward motion of the vehicle as a function of the input from the current speed sensor, of the output from the one or more leading distance sensors, of the output of the one or more leading speed sensors, of the output of the one or more following distance sensors, and of the output of the one or more following speed sensors.

In accordance with another aspect of the present invention. the inputs from the driver input to the vehicle controller system can be selectively masked. Conversely, the driver may override the automated system when desired.

In accordance with a further aspect of the present invention, the vehicle controller system provides an output to the mechanism to control forward motion of the vehicle as a function of the outputs of the one or more leading distance sensors, of the one or more leading speed sensors, of the one or more following distance sensors, of the one or more following speed sensors, and of the current speed sensor.

The vehicle can include a fuel controller and a braking system and the controller system can provide output to the fuel controller and to the braking system.

In accordance with one aspect of the present invention, acceleration instructions can be provided by the vehicle controller system to the mechanism for controlling forward motion according to the function:

$$a=f(k_d(d_1-d_f)+k_v((v_1-v_c)+(v_f-v_c)))$$

where
a is the acceleration control signal provided to the (controlled) vehicle by the vehicle controller system;
$d_1$ is the distance of a first (leading) vehicle in front of the controlled vehicle;
$d_f$ is the distance of a second (following) vehicle behind the controlled vehicle;
$v_1$ is the speed of the first (leading) vehicle;
$v_c$ is the speed of the (controlled) vehicle;
$v_f$ is the speed of the second (following) vehicle;
$f(\ldots)$ is a selected monotonic function; and
$k_d$ and $k_v$ are gain factors.

The transfer function $f(\ldots)$ may simply be the identity function (i.e. $f(x)=x$) or may, for example, have a sigmoidal shape such as the hyperbolic trigonometric tangent or "tanh" function, in order to limit extremes in acceleration and deceleration.

Other functions that can be used include:

$$a=f(k_d(d_1-d_f)+k_v((v_1-v_c)+(v_f-v_c))+k_c(v_{des}-v_c))$$

where
a is the acceleration control signal provided to the (controlled) vehicle by the vehicle controller system;
$d_1$ is the distance of a first (leading) vehicle in front of the vehicle;
$d_f$ is the distance of a second (following) vehicle behind the vehicle;
$v_1$ is the speed of the first (leading) vehicle;
$v_c$ is the speed of the (controlled) vehicle;
$v_f$ is the speed of the second (following) vehicle;
$v_{des}$ is the desired speed of the vehicle;
$f(\ldots)$ is an selected monotonic function; and
$k_d$, $k_v$ and $k_c$ are gain factors.

In accordance with various aspects of the present invention, the one or more leading distance sensors and the one or more following distance sensors can be selected from the group consisting of radar sensors, lidar sensors, sonar sensors, machine vision sensors, image processing systems, a binocular stereo imaging system which exploits the parallax between images obtained using two spatially separated cameras, trinocular stereo systems and monocular systems.

In accordance with other aspects of the present invention, the speed sensors can be selected from the group of radar, lidar, and sonar systems that measure Doppler signals, or from machine vision and image processing systems. The speed sensors may be ones that only provide relative speeds, that is the differences in speed $(v_1-v_c)$ and $(v_f-v_c)$.

In accordance with an aspect of the present invention, a method is provided for controlling a forward motion of a moving vehicle having a current speed and a mechanism to control forward motion of the moving vehicle between a moving leading vehicle and a moving following vehicle, comprising: a controller which is secured in the moving vehicle determining a distance between the moving leading vehicle and the moving vehicle, a relative speed between the moving leading vehicle and the moving vehicle, a distance between the moving following vehicle and the moving vehicle, a relative speed between the moving following vehicle and the moving vehicle and the controller processing the distance between the moving leading vehicle and the moving vehicle, the relative speed between the moving leading vehicle and the moving vehicle, the distance between the moving following vehicle and the moving vehicle and the relative speed between the moving following vehicle and the moving vehicle to provide an output to control forward motion of the moving vehicle to position the moving vehicle at a desired position between the moving leading vehicle and the moving following vehicle, wherein the desired position is variable.

In accordance with a further aspect of the present invention a method is provided, wherein the output of the controller is provided to a mechanism to control forward motion of the moving vehicle.

In accordance with yet a further aspect of the present invention a method is provided, wherein the output of the controller is an alert provided to a driver of the moving vehicle.

In accordance with yet a further aspect of the present invention a method is provided, further comprising, the controller suppressing positive acceleration of the moving vehicle when the current speed is equal to or greater than a maximum allowable speed.

In accordance with yet a further aspect of the present invention a method is provided, further comprising the controller determining that a brake light on the moving leading vehicle is on.

In accordance with yet a further aspect of the present invention a method is provided, wherein an acceleration of the moving leading vehicle is provided to the controller.

In accordance with yet a further aspect of the present invention a method is provided, wherein an acceleration of the moving following vehicle is provided to the controller.

In accordance with yet a further aspect of the present invention a method is provided, wherein at least the moving following vehicle and the moving leading vehicle apply a bilateral control method.

In accordance with yet a further aspect of the present invention a method is provided, wherein the desired position is based on a minimum safe separation of vehicles.

In accordance with yet a further aspect of the present invention a method is provided, wherein the vehicles are airplanes.

In accordance with another aspect of the present invention a system is provided to control a forward motion of a moving vehicle having a mechanism to control forward motion of the moving vehicle between a moving leading vehicle and a moving following vehicle, comprising a vehicle controller system secured in the moving vehicle, the vehicle controller system is configured to perform the following steps determining a distance between the moving leading vehicle and the moving vehicle, a relative speed between the moving leading vehicle and the moving vehicle, a distance between the moving following vehicle and the moving vehicle and a relative speed between the moving following vehicle and the moving vehicle and processing the distance between the moving leading vehicle and the controlled moving vehicle, the relative speed between the moving leading vehicle and the controlled moving vehicle, the distance between the moving following vehicle and the controlled moving vehicle and the relative speed between the moving following vehicle and the moving vehicle to provide an output to control forward motion of the moving vehicle to position the moving vehicle at a desired position between the moving leading vehicle and the moving following vehicle, wherein the desired position is variable.

In accordance with yet another aspect of the present invention a system is provided, wherein the output of the controller is provided to the mechanism to control forward motion of the moving vehicle.

In accordance with yet another aspect of the present invention a system is provided, wherein the output of the controller is an alert provided to a driver of the moving vehicle.

In accordance with yet another aspect of the present invention a system is provided, further comprising, the controller suppressing positive acceleration when the current speed is equal to or greater than a maximum allowable speed.

In accordance with yet another aspect of the present invention a system is provided, further comprising: the controller determining that a brake light on the moving leading vehicle is on.

In accordance with yet another aspect of the present invention a system is provided, wherein an acceleration of the moving leading vehicle is provided to the controller.

In accordance with yet another aspect of the present invention a system is provided, wherein an acceleration of the moving following vehicle is provided to the controller.

In accordance with yet another aspect of the present invention a system is provided, wherein at least the moving following vehicle and the moving leading vehicle include a bilateral control system.

In accordance with yet another aspect of the present invention a system is provided, wherein the desired position is based on a minimum safe separation of vehicles.

In accordance with yet another aspect of the present invention a system is provided, wherein the vehicles are airplanes.

In accordance with yet another aspect of the present invention a system is provided, wherein a relative speed of the moving leading vehicle is based on information provided by a wireless device on the moving leading vehicle to a wireless device on the moving vehicle, and wherein the relative speed of the moving following vehicle is based on information provided by a wireless device on the moving following vehicle to the wireless device on the moving vehicle.

The present invention also contemplates various methods of controlling the forward motion of the vehicle as described herein.

DETAILED DESCRIPTION OF THE INVENTION

The solution to the traffic instability problem is to obtain enough total gain in each vehicle control system to prevent collisions, yet avoid a gain greater than one in any individual pathway from an input to an output. To achieve this, the control system takes into account not only the position and speed of a leading vehicle, but also the position and speed of a following vehicle. In other words, the control system is based on bilateral feedback using information that flows in both directions—from back to front and from front to back—and not just from front to back. In order to avoid ambiguity, we use the terms, "following vehicle," "controlled vehicle," and "leading vehicle" for three vehicles following one another as 'F', 'C', and 'L' do in FIG. 1. The focus is on the control system of the center or "controlled" vehicle. Of course, the leading and following vehicles may also have such control systems, but to avoid ambiguity we focus on the control system of the center or "controlled" vehicle in the description of the invention.

If the gain of the control loop is around ½ when measured from the leading vehicle input and also around ½ when measured from the following vehicle input, then there is enough overall gain to avoid collisions, but the gain going from front to back or from back to front is less than one (namely about ½), thus rapidly attenuating any oscillations or travelling waves going in either direction.

Figure 1:
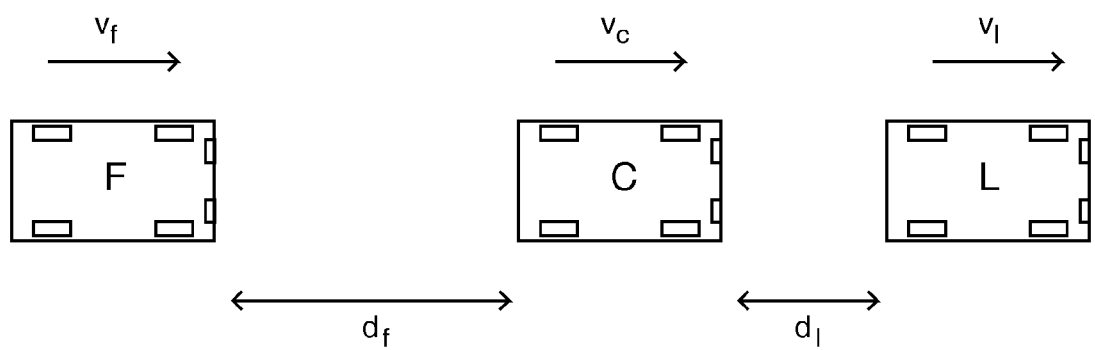
FIG. 1 illustrates three vehicles, from left to right: a following vehicle 'F,' a controlled vehicle 'C,' and a leading vehicle 'L'.
Figure 2A:
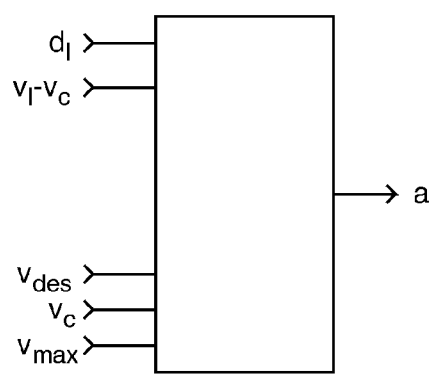
FIG. 2a illustrates a traditional "car following" control system based on the difference in the distance between the controlled vehicle and a leading vehicle as well as the differences in their speeds, with optional additional inputs, such as the speed of the controlled vehicle.
Figure 2B:
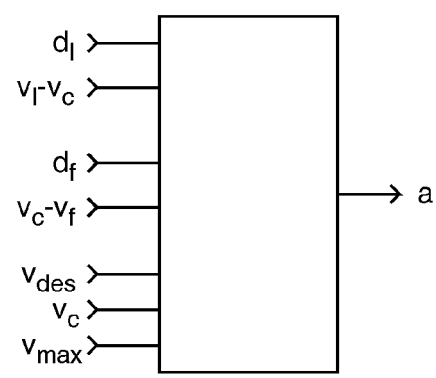
FIG. 2b illustrates an exemplary control system of the invention using bilateral feedback from leading and following vehicles to the controlled vehicle.

In the simplest version of this system, a center vehicle between a leading vehicle and a following vehicle maintains a position halfway between the leading and following vehicles. As depicted in FIG. 1, traffic flows from left to right. The controlled vehicle 'C' follows the leading vehicle 'L' and precedes the following vehicle 'F'. The center or controlled vehicle 'C' is a distance $d_1$ from the leading vehicle 'L', and the following vehicle 'F' is a distance $d_f$ from the center vehicle 'C'. The leading vehicle 'L' is traveling at speed $v_1$, the center vehicle 'C' at speed $v_c$, and the following vehicle 'F' at speed $v_f$. Unlike the simple car following system, the new bilateral feedback control system uses the distance $d_f$ between the center vehicle and the following vehicle and their difference in speeds $(v_f-v_c)$, as well as the distance $d_1$ between the leading vehicle and the center vehicle and the difference in their speeds $(v_1-v_c)$ as inputs.

Figure 3:
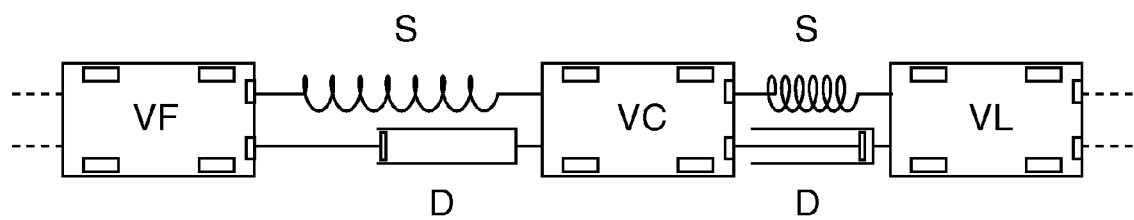
FIG. 3 illustrates a mechanical/spring/damper system that is an analog of the bilateral control system of the invention.

The operation of a system of bilateral feedback control for vehicular traffic can be illustrated by analogy to a mechanical mass/spring/damper system. Such an analogous mechanical system is depicted in FIG. 3 where springs S and dampers D are connected between leading, controlled, and following moving masses (representing vehicles) VL, VC, and VF. The springs S model adjustment of speed based on distance because, by Hooke's law, the force in a spring is proportional to the extension from its rest length, and by Newton's second law of motion, the acceleration (rate of change of speed) is the force divided by the mass of the vehicle. The dampers or shock absorbers D connecting the vehicles, on the other hand, model the control proportional to the relative velocities of the vehicles because the force in a damper is proportional to the rate of compression or expansion of the damper.

Any movement of a mass in a string of masses (modeling the vehicles) connected one to the next with a spring and a damper (modeling the control systems) will be transmitted along the chain, but will be damped out along the chain by the mass/spring/damper combination. The damping may work better at some frequencies than at others, but there will never be any increase in amplitude along the chain. For one thing, in such a purely passive system (i.e. one without active components that could amplify signals) there is no energy source to support increasing amplitudes of motion.

This physical model does not apply to the "car following" control systems described earlier. It may appear at first sight that a spring and a damper could model a "car following" control system where acceleration is proportional to relative distance and relative velocity with respect to the leading vehicle. But, pursuant to Newton's third law that every action has an equal and opposite reaction, the springs and dampers of the bilateral feedback control system exert forces not just on the controlled vehicle, as desired, but also on the leading vehicle. There is nothing comparable to this in the car following model, because the driver of the controlled vehicle only pays attention to the leading vehicle, and the driver of the leading vehicle correspondingly does not pay attention to the controlled vehicle behind. There is no accounting for the forces generated by a following vehicle in the simple car following system, where the driver does not take the following vehicle into account.

Bilateral feedback control of vehicular traffic "cools" the motions of a group of vehicles to ameliorate traffic instabilities. For example, if a number of vehicles using bilateral feedback control begin with different initial velocities and different inter-vehicle spacing, the "damper" part of the control system will dissipate the kinetic and potential energy resulting from departures from the average, thus reducing the difference between individual vehicles motions and the average of the group of vehicles. Without outside disturbances, the group of vehicles asymptotically approaches synchrony. This movement of vehicles subjected to bilateral feedback control is comparable to the movement of molecules in a flow of gas. Individual gas molecules move relative to an average with a speed that depends on the temperature of the gas, where the hotter the gas the more rapid the relative motion. Dropping the temperature corresponds to reducing the velocity differences relative to the overall motion of the group of molecules. As the gas is cooled it may undergo a phase change, such as changing from gaseous to liquid form. Similarly, a group of vehicles using bilateral feedback control may enter a phase in which the vehicles are all travelling at essentially the same speed and the inter-vehicle spaces are essentially the same.

Bilateral feedback control differs from the "platoon" system of the prior art because: (i) in at least one embodiment of the present invention there is no direct communication between the leading vehicle and a number of following vehicles; (ii) no single driver is in control of a group of vehicles, (iii) vehicles can easily leave and join the group, and (iv) a group of vehicles can react to disturbances and move to the "cool" equilibrium phase where vehicle velocities and inter-vehicle spacing are nearly the same.

Bilateral feedback control might be implemented merely by training all drivers to pay attention to following vehicles and to refrain from following a leading vehicle too closely. Ideally, each driver would be trained to aim to be roughly half way between a leading and a following vehicle and to aim for a speed roughly half way between the speeds of the following and leading vehicles. This simple solution would greatly damp out traffic flow instabilities, but it would require a large fraction of drivers to adopt this unfamiliar driving mode for effectiveness. Further, paying attention to a following vehicle would take attention away from the leading vehicle and possibly reduce safety. Also, some drivers are likely to be loath to leave a gap behind a leading vehicle that non-cooperating drivers from other lanes may decide to populate.

Some form of automation or partial automation is preferable, where instruments determine the relative position and speed of leading, controlled, and following vehicles and use this information either to automatically control the acceleration of the vehicle or provide suggestions to the human operator. The sensors may be in the vehicle or in the supporting infrastructure. For example, electronic cameras mounted and aimed forward and aft of a vehicle could be used to estimate distance and velocity to the nearest leading and following vehicle using machine vision methods such as "optical flow," "time to contact," and binocular or trinocular stereo. Laser, ultrasound and radar measurement technique could also be used, although more expensive and less able to discriminate between vehicles in the same lane and those in adjacent lanes.

Figure 4:
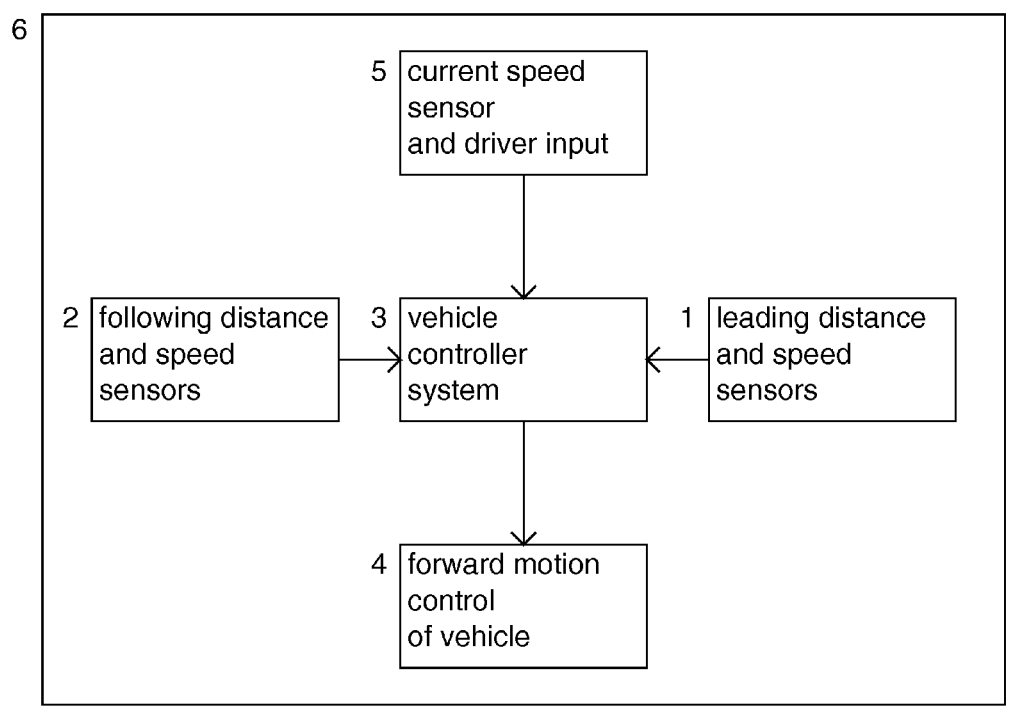
FIG. 4 illustrates an embodiment of the invention employing means for measuring relative positions and speeds of leading and following vehicles and means for adjusting the rate of forward motion of the controlled vehicle which can be deployed inside one or more vehicles.

As depicted in FIG. 4, in another embodiment of the invention a vehicle 6 employs means 1 for measuring the relative position of the leading vehicle in relation to the center vehicle; means 2 for measuring the relative position of the following vehicle in relation to the center vehicle; means 3 for determining how to adjust the forward motion of the center, vehicle; and means 4 for adjusting the forward motion of the of the center vehicle. Optionally, additional means may be included for measuring the speed of the vehicles and for enabling supervisory control inputs from the driver 5. The driver, may, for example, have a choice of driving modes rather than needing to provide detailed control. That is, the driver, instead of constantly controlling the accelerator and brakes, may instead chose between a control mode that is more aggressive in keeping up with traffic, at the cost of more rapid accelerations and decelerations, or a more mellow mode in which rapid changes in velocity are avoided when possible. The means (1), (2), (3), (4), and (5) are preferably provided in a vehicle (6).

The means (1) and (2) for measuring the relative position of the leading and following vehicles may include traditional distance measuring methods such as radar, lidar, or sonar. However, machine vision and image processing methods provide lower cost solutions. For example, distance can be measured using a binocular stereo system which exploits the parallax between images obtained using two spatially separated cameras. Pairs of cameras can be mounted behind the windshield and the rear window or other suitable location on the vehicle and may also be used for other purposes. Trinocular stereo systems require a third camera, but in turn reduce the computational complexity of determining matches between images from the cameras. Finally, even monocular systems using a single camera can be used to estimate distance based on the size of the image of the leading and following vehicles. Specifically, $$D=S \times f/p,$$

where D is the distance to the vehicle, S the assumed size of the vehicle, f the principal distance of the optical system (focal length) and p the measured size of the image of the vehicle. Such monocular systems require fewer cameras but are not as accurate as binocular or trinocular systems, since they depend on an accurate estimate of the actual size S of the vehicle.

The means (1) and (2) for measuring the relative position of the leading and following vehicles may include means for measuring their relative speed using traditional velocity measuring techniques based on, for example, the Doppler effect on radar, lidar, or sonar signals. Alternatively, relative speed can be estimated from measurements of relative distance at two different times. Machine vision and image processing systems can provide lower cost methods for determining relative speed as well. The speed can, for example, be determined by dividing the known distance between vehicles by the estimated "time to contact" (TTC) that is, $$v=D/T$$

where v is the speed, D the distance and T the time to contact. The time to contact is the ratio of distance to speed. It can be estimated from measurements of the size of the vehicle image at two different times. Specifically, $$T=s_1 \times (t_2-t_1)/(s_2-s_1),$$

where T is the time to contact, while $s_1$ and $s_2$ are the measured image sizes at times $t_1$ and $t_2$ respectively. Note that this expression for the time to contact does not require knowledge of vehicle size, distance, or even the focal length f of the camera (and so can be used with uncalibrated cameras).

More sophisticated methods for determining the time to contact exploit image brightness gradients, that is, derivatives of brightness with respect to the two spatial image dimensions and with respect to time. One such method determines time to contact directly (see, e.g. Horn, B. K. P., Y. Fang & I. Masaki, "Time to Contact Relative to a Planar Surface," *IEEE Transactions on Intelligent Transportation Systems*, June 2007); another first determines the "focus of expansion" (FOE) (see e.g. McQuirk, I. S., B. K. P. Horn, H.-S. Lee, and J. L. Wyatt, "Estimating the Focus of Expansion in Analog VLSI," *International Journal of Computer Vision*, July 1998). Such gradient-based methods typically produce more accurate results than methods based on estimates of the size of images of objects. Still other alternatives are available, some based on the so-called "optical flow" (see e.g. Horn, B. K. P. and S. Negandaripour, "Direct Passive Navigation," *IEEE Transactions on Pattern Analysis and Machine Intelligence*, January 1987).

The means (3) for determining suitable inputs for the mechanism controlling forward motion may use analog circuitry and/or digital computation, and may, for example, be implemented in electronic, hydraulic, or pneumatic form. If in digital form, the circuitry may, for example, be in discrete component form, or ASIC (Application Specific Integrated Circuit) or FPGA (Field Programmable Gate Array). The description of the circuitry hardware may be in some HDL (Hardware Description Language) such as Verilog. Alternatively, the control system may be implemented as an algorithm in a general purpose computer such as a microprocessor with suitable software or firmware. The control system determines what changes in vehicle forward motion to request based on inputs from the systems measuring relative vehicle position and speed.

In the simplest case, the vehicle acceleration is made proportional to a weighted sum of the difference between the distance to the leading and the following vehicles and the sum of the relative speed of the leading and following vehicles with respect to that of the controlled vehicle. More sophisticated control schemes are possible which take into account the legal speed limit, the driver's preferences, and signals from roadside traffic alert systems. Positive acceleration can, for example, be "vetoed" when the current speed is already near the legal limit. Optionally, additional inputs (5) may be provided to the vehicle control system (3). These may include the current speed of the vehicle itself, the legal speed limit, and a desired speed range set by the driver of the vehicle. The speed of the vehicle may be determined directly from wheel rotation or using "fifth wheel" technology, using, for example, the Doppler effect on radar signals reflected from the pavement.

The means (4) for adjusting the forward motion of the vehicle may be accomplished by controlling engine output by, for example, adjusting the supply of air and/or fuel to the engine, and/or by controlling the braking mechanism. The means (4) for adjusting the forward motion of the vehicle may also be based on existing cruise control mechanisms. These can be used directly by changing the desired speed input setting to the system. For more flexible control, existing "fly by wire" systems, as found in some vehicles equipped for use by handicapped drivers, can be used. Fly by wire system are commercially available and were used, for example, in vehicles of the DARPA (Defense Advanced Research Projects) "Grand Challenge" and "Urban Challenge" competitions. Control in the case of vehicles propelled by electrical motors is even simpler. In this case, the motor torque is directly proportional to the motor current, and the acceleration of the vehicle in turn is proportional to motor torque. Reversing the direction of current flow reverses the torque and provides for controlled deceleration as well as acceleration.

Figure 5:
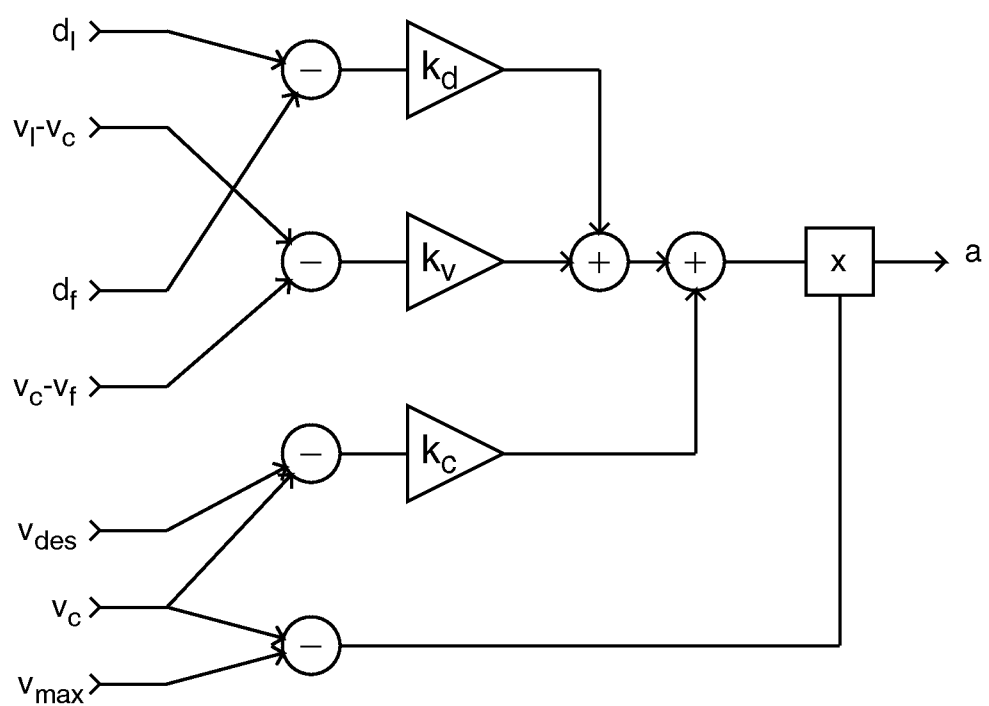
FIG. 5 is a block diagram of an embodiment of the control system of FIG. 4.

FIG. 5 is a partial block diagram of one embodiment of the automatic vehicle control system (3) illustrated in FIG. 4. Four subtractors compute four differences of inputs, which can then be multiplied by selectable gain factors and added to arrive at an overall acceleration command a. The gain factor $k_d$ multiplies the difference between the distance to the leading vehicle and the following vehicle. This component of the control signal produces acceleration outputs that tend to equalize these two distances, and to position the center vehicle in the middle between the leading and the following vehicles.

The gain factor $k_v$ multiplies the sum of the relative speeds of the leading and following vehicles relative to the center vehicle. This component of the control signal has the important function of damping out oscillations and adjusting the speed of the center vehicle to be close to the average of the speeds of the leading and following vehicles. The gain factor $k_c$ multiplies the difference between the actual speed and the desired speed $v_{des}$. This component of the control signal tends to bring the speed closer to the desired speed. This component may be enabled in some embodiments only when there is no leading vehicle or when there is no leading or following vehicles because there is then no control input from leading or following vehicles.

Positive acceleration outputs can be suppressed by the "veto" box marked 'x' when the actual speed is equal to or greater than the maximum speed, that is, when $(v_c - v_{max}) \square 0$. The gain factors $k_d$, $k_v$, and $k_c$ can be chosen empirically, analytically, or based on simulation results, to achieve smooth stable control. Suitable values of these constants will depend on such factors as the weight of the vehicle and the responsiveness of the engine and brake control. In practice additional functions may be implemented in the control system, such as overall changes to the control behavior when there is no leading vehicle and/or no following vehicle. In this case, the vehicle control can revert to a simple cruise control system that attempts to maintain a stable speed at or below the legal limit.

In one automatic embodiment of the invention, the bilateral feedback control system attempts to maintain the controlled or center vehicle about halfway between the leading vehicle and the following vehicle. Many variations on this basic scheme are conceivable, for example, the aimed-for position may be other than right in the middle between the vehicle ahead and the vehicle behind. When the average speed of leading and following vehicles is far below the legal limit, for example, then the controlled vehicle may aim for a position somewhat ahead of the center. Conversely, when the average speed of leading and following vehicles is higher than the speed desired by the driver of the controlled vehicle, then the system may aim for a position somewhat behind the center. There would also be additional control rules that take into account minimum safe separation, relative speeds, speed limits, weather and lighting conditions, traffic density and traffic advisories. Special rules could deal with the situation when there is in fact no vehicle ahead and/or no vehicle behind. The key innovation here is that information about distance and speed of the vehicle following is taken into account—along with that of the leading vehicle.

In another form of the invention, some indication is given to the driver about whether it would be beneficial to speed up, slow down, or maintain the current speed, or suggestions to move up to the vehicle ahead, drop further back, and so on. This would leave the driver in control, but provide damping of the traffic instabilities if a sufficient number of drivers pay heed to the signals. A control panel could, for example, have a set of green, orange, and red lights indicating to the driver whether it would be beneficial to speed up, maintain the current speed, or slow down. An indication may also be provided as an audio signal, a text on a display, any visual signal or a haptic signal. The indication signal may be of a binary nature, such as DO or DO NOT ACCELERATE. The indication signal may also be one of more than two states, indicating for instance in three states "brake," "do nothing," or "accelerate." The indication signal may provide a very specific instruction, such as "accelerate" until a certain speed is achieved. The indication signal may also instruct a gradual increase or decrease in speed.

If all, or at least most, vehicles have a control system of the instant invention, traffic will flow smoother at high densities and existing roadways can sustain substantially higher throughputs. Gas consumption will be reduced, as will time lost sitting in stop-and-go traffic. Wear and tear on roads, tires and vehicles will be lowered and the incidence of accidents reduced. The benefits to the community will be enormous, since more traffic can be accommodated without adding to the roadway infrastructure.

While some embodiments are illustrated using linear control systems, where the control output is proportional to the sum of the products of gain factors and inputs, the invention is not restricted to linear control systems, but also encompasses non-linear control systems as well, including switching mode control and state-space control. Also, the present invention uses distances and relative velocities of leading and following vehicles, however, other information or measurements can also be usefully added. For example, information from sensors indicating whether the brake lights of the leading care are on or not, or sensors able to directly determine the accelerations of leading and following vehicles, in addition to distances and relative velocities can be used. If available, information about vehicles ahead of the leading vehicle and vehicles behind the following vehicle can also be used.

That brake lights are illuminated, can be detected by a camera, which may be connected to a processor which is programmed to conduct image processing routines. A camera may be focused on a leading vehicle. In an embodiment of the present invention the processor determines from camera images that the leading car has activated the brakes. The processor may determine how long the brakes have been activated and determine an action or recommendation based on the duration of the "brakes on" event. For instance, the brakes may be activated briefly, for instance for a duration of 1 or 2 seconds or at least less than 5 seconds. Based on an actual speed and the duration of "brakes on," the processor may decide in that condition that the center vehicle should not accelerate. The processor may also decide that the center vehicle should decelerate. A "brakes on" detection combined with a detected rapidly deceleration of a leading vehicle may cause the system on the center vehicle to override human action and activate the brakes on the center vehicle to avoid a collision. Other actions, including increasing deceleration and slow acceleration after a brake light goes out, are contemplated. Accordingly, the "brakes on" detection through a camera provides an additional input to the system that may be applied to influence the bilateral control and prevent premature action by a driver of a center vehicle. As a consequence, an illumination of a brakelight on a leading car may cause a gradual or a sudden adjustment of an acceleration or deceleration on a center vehicle or may cause a prevention of an acceleration or deceleration of a center vehicle.

Thus, the present invention provides method and apparatus for reducing traffic flow instabilities using bidirectional information flow so that information from a vehicle in front of a center vehicle and information from a vehicle behind the center vehicle is used to control the operation of the center vehicle. The method and apparatus can use feedforward in addition to feedback, that is, bilateral control. The present invention uses information regarding the motion of following vehicles as well as leading vehicles. The present invention can also use the acceleration, velocity, relative distances or relative velocity a vehicle directly following as well as directly leading the vehicle. The needed information can be acquired using electronic cameras and computational devices using machine vision methods.

Currently, different efforts are underway to define, standardize and/or implement methods for communication between vehicles. This includes V2V (Vehicle-to-Vehicle) technology, WAVE (Wireless Access for Vehicular Environments), DSRC (dedicated short-range communications, a U.S. Department of Transportation project), CALM (Communications, Air-Interface, Long and Medium range), the IEEE 802.11p standard, as well as existing communication methods such as BlueTooth and WiFi. In one embodiment of the present invention wireless communication may augment, or even replace information from sensors in the controlled vehicle with information from sensors in leading and following vehicles. Such sensors may include wheel rotation pickups for speed, geo-location (GPS) sensors for position as well as velocity, accelerometers, gas pedal and brake position sensors.

In one embodiment of the present invention a network, as formed by Bluetooth or WiFi enabled devices on a moving (center) vehicle and a leading and a following vehicle, form an ad hoc network. While the distances and relative velocities of leading and following vehicles can be determined using sensors on the moving center vehicle, as described above, that information may also be provided by the leading and following vehicles, for instance via the ad hoc network, and by using already available sensors, to the processor on the center vehicle.

Besides the communication technologies mentioned above, there are other mobile and wireless methods enabling communication between devices on different moving vehicles that are already available or currently under development. One is a switched network for cellular phones or satellite phones. Other networks include dedicated short-range communications or DSRC networks. Such networks may include communication with infrastructure components such as cell phone towers, satellites, and roadside transmitters that enable data exchange with servers on a network, or with vehicles that are too far away for direct wireless communication from a center vehicle.

Velocity and/or positional information may, for example, be transmitted from the leading and following vehicles using radio frequency (RF) communication or visible or infrared light.

In one embodiment of the present invention sensors on the center vehicle are replaced with sensors in the leading and following vehicles. One advantage of this approach is cost reduction, since, for example, a vehicle can sense its own velocity directly, with simpler sensors than those needed to estimate its velocity from another vehicle. Also, a system using information conveyed from leading and following vehicles may benefit from the potentially higher accuracy and timeliness of the information. Such information can be used in place of, or in addition to, information gathered by sensors on the moving vehicle itself.

Another embodiment of the present invention augments the information from sensors on the center vehicle with information from sensors in the leading and following vehicles. One advantage of this approach is robustness due to redundancy, since the failure of a wireless link does not disable the bilateral control system of the center vehicle. If a combination of sensors on the moving vehicles and communication from leading and following vehicles is used, then a failure of an individual information source does not perturb the stability of the overall traffic flow and the suppression of traffic flow instabilities at all.

Importantly, this type of networked communication between neighboring vehicles is different from that used in "platooning", where communication:

(i) is from one leading vehicle to all vehicles in a "platoon";
(ii) is one way only, from the leader to the followers in the "platoon";
(iii) is not just to immediate neighbors but also to vehicles further away.

In contrast, in at least one embodiment of the present invention there is no direct communication between the leading vehicle and a number of following vehicles; and communication in the present invention is two-way, wherein information flows both up stream and down stream.

Flow instabilities will occur in any situation where control of each moving vehicle is based on distance and relative velocity of the leading vehicle (the so-called "car following" model) and is properly addressed by the bilateral control, disclosed herein. This is not restricted to automobiles, but applies, for example, to aircraft flying in another's wake, for instance, to save fuel. So far tests of planes "drafting" or "vortex surfing" have been restricted to just pairs of planes, where the second plane has considerable fuel savings, but the idea can be extended to any number of planes flying in the wake of others, much as migrating birds often do.

The types of flow instabilities described here apply to such systems as well, and can be suppressed using the same methods of bilateral control which is provided in accordance with one or more aspects of the present invention.

In a further embodiment of the present invention each vehicle involved in bilateral control has an accurate geo-location system such as a Global Positioning System (e.g. GPS, GLONASS, or GALILEO) device that provides location and change of location with an accuracy in the sub-meter range, preferably in the decimeter range, and more preferably in the centimeter range. GPS receivers, as part of their normal operation, provide not only position but also accurate estimates of velocity. Each vehicle, or GPS device on a vehicle, has its own unique identifier and is configured to provide, through the wireless network, its GPS data in response to a request, which preferably is an authorized request. For instance, a vehicle control device can opt in to participate in bilateral control and is configured to provide relevant data, such as GPS data, but also other data that is available from one or more sensors on the vehicle, to a requesting device on another vehicle and to provide relevant data upon request.

It is known that smart phones and navigation devices contain sensors such as GPS sensors. In one embodiment of the present invention these devices are configured to provide data via the wireless network to leading and following vehicles. In one embodiment of the present invention, a processor on a vehicle with access to a GPS device is configured to request GPS and other data from vehicles in its environment and, based on the GPS data, is enabled to determine what the closest following and leading vehicles are. The processor applies the collected GPS data to determine the relevant distances, speeds and accelerations of the surrounding vehicles to determine a desired position and/or speed and/or acceleration of the vehicle using the bilateral control as disclosed herein.

In one embodiment of the present invention a center vehicle establishes wireless contact with a directly leading and a directly following vehicle to determine bilateral position control and no positional or speed data is required from other vehicles. In a further embodiment of the present invention there is wireless data exchange with vehicles that are not direct neighbors to a center vehicle.

While there have been shown and described fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims appended hereto.

The invention claimed is:

1. A method for controlling a forward motion of a moving vehicle having a current speed and a mechanism to control forward motion of the moving vehicle between a moving leading vehicle and a moving following vehicle, comprising:
determining, by a controller which is secured in the moving vehicle, a distance and relative speed between the moving leading vehicle and the moving vehicle, a distance and relative speed between the moving following vehicle and the moving vehicle; and
the controller processing the distance and relative speed between the moving leading vehicle and the moving vehicle, and the distance and relative speed between the moving following vehicle and the moving vehicle, to provide an output to control forward motion of the moving vehicle to position the moving vehicle at a desired position between the moving leading vehicle and the moving following vehicle, wherein the desired position is variable.

2. The method of claim 1, wherein the output of the controller is provided to a mechanism to control forward motion of the moving vehicle.

3. The method of claim 1, wherein the output of the controller is an alert provided to a driver of the moving vehicle.

4. The method of claim 1, further comprising, the controller suppressing positive acceleration of the moving vehicle when the current speed is equal to or greater than a maximum allowable speed.

5. The method of claim 1, further comprising the controller determining that a brake light on the moving leading vehicle is on.

6. The method of claim 1, wherein an acceleration of the moving leading vehicle is provided to the controller.

7. The method of claim 1, wherein an acceleration of the moving following vehicle is provided to the controller.

8. The method of claim 1, wherein at least the moving following vehicle and the moving leading vehicle apply the control method of claim 1.

9. The method of claim 1, wherein the desired position is based on a minimum safe separation of vehicles.

10. A system to control a forward motion of a moving vehicle having a mechanism to control forward motion of the moving vehicle between a moving leading vehicle and a moving following vehicle, comprising:
a vehicle controller system secured in the moving vehicle that is configured to perform the following steps:
determining a distance and relative speed between the moving leading vehicle and the moving vehicle, a distance and relative speed between the moving following vehicle and the moving vehicle; and
processing the distance and relative speed between the moving leading vehicle and the controlled moving vehicle, and the distance and relative speed between the moving following vehicle and the controlled moving vehicle, to provide an output to control forward motion of the moving vehicle to position the moving vehicle at a desired position between the moving leading vehicle and the moving following vehicle, wherein the desired position is variable.

11. The system of claim 10, wherein the output of the controller is provided to the mechanism to control forward motion of the moving vehicle.

12. The system of claim 10, wherein the output of the controller is an alert provided to a driver of the moving vehicle.

13. The system of claim 10, further comprising, the controller suppressing positive acceleration when the current speed is equal to or greater than a maximum allowable speed.

14. The system of claim 10, further comprising: the controller determining that a brake light on the moving leading vehicle is on.

15. The system of claim 10, wherein an acceleration of the moving leading vehicle is provided to the controller.

16. The system of claim 10, wherein an acceleration of the moving following vehicle is provided to the controller.

17. The system of claim 10, wherein at least the moving following vehicle and the moving leading vehicle include the system of claim 10.

18. The system of claim 10, wherein the desired position is based on a minimum safe separation of vehicles.

19. The system of claim 10, wherein a relative speed of the moving leading vehicle is based on information provided by a wireless device on the moving leading vehicle to a wireless device on the moving vehicle, and wherein the relative speed of the moving following vehicle is based on information provided by a wireless device on the moving following vehicle to the wireless device on the moving vehicle.

20. The system of claim 19, wherein the information from the controller system on the moving vehicle is augmented by wireless information from the moving leading vehicle and the moving following vehicle.

21. The system of claim 19, wherein there is no direct communication between the moving leading vehicle and the moving vehicle.

22. The system of claim 19, wherein there is no direct communication between the moving following vehicle and the moving vehicle.

23. The system of claim 19, wherein there is wireless data exchange with vehicles that are not direct neighbors to the moving vehicle.

* * * * *